United States Patent
Elias et al.

[11] Patent Number: 5,926,357
[45] Date of Patent: Jul. 20, 1999

[54] ALUMINUM ELECTROLYTIC CAPACITOR FOR IMPLANTABLE MEDICAL DEVICE

[75] Inventors: William H. Elias, Six Mile, S.C.; Timothy A. Fayram, Gilroy, Calif.

[73] Assignee: Pacesetter, Inc., Sunnyvale, Calif.

[21] Appl. No.: 08/876,274

[22] Filed: Jun. 16, 1997

Related U.S. Application Data

[63] Continuation-in-part of application No. 08/567,460, Dec. 5, 1995., abandoned

[51] Int. Cl.⁶ .................................................. H01G 4/35
[52] U.S. Cl. .......................... 361/302; 361/520; 361/538; 361/540; 29/25.03; 607/5
[58] Field of Search .................................. 174/52.1, 143, 174/152 R, 152 GM; 361/302, 517–520, 535–538, 540; 29/25.03; 607/5–8

[56] References Cited

U.S. PATENT DOCUMENTS

| | | |
|---|---|---|
| 2,049,671 | 8/1936 | Sprague . |
| 2,307,561 | 1/1943 | Bailey . |
| 3,859,574 | 1/1975 | Brazier . |

*Primary Examiner*—Dean A. Reichard
*Assistant Examiner*—Anthony Dinkins
*Attorney, Agent, or Firm*—Steven M. Mitchell

[57] ABSTRACT

An aluminum electrolytic capacitor with an aluminum housing defining a chamber, and having a feed-through aperture providing communication with the chamber from outside of the housing. A number of aluminum anode layers are positioned within the chamber, and a feed-through member formed of a first conductive material occupies the feed-through aperture. The feed-through member has an inner end extending into the chamber, an outer end extending externally from the housing, and an insulative sleeve encompassing an intermediate portion of the feed-through member and directly contacting the housing at the feed-through aperture to prevent electrical contact between the feed-through member and the housing. A connection element formed of a second different conductive material is attached to the inner end of feed-through member and spaced apart from the housing. A compressible insulative gasket may be positioned between the housing and the connection element to provide insulation and a fluid seal.

16 Claims, 4 Drawing Sheets

ALUMINUM ELECTROLYTIC CAPACITOR FOR IMPLANTABLE MEDICAL DEVICE

This application is a continuation-in-part of application Ser. No. 08/567,460 filed on Dec. 5, 1995, abandoned.

FIELD OF THE INVENTION

This invention relates to electronic components for implantable medical devices, and more particularly to charge storage components for cardiac stimulation devices.

BACKGROUND AND SUMMARY OF THE INVENTION

Defibrillators are implanted in patients susceptible to cardiac arrhythmias or fibrillation. Such devices provide cardioversion or defibrillation by delivering a high voltage shock to the patient's heart, typically about 500–750V. High voltage capacitors are used in defibrillators to accumulate the high voltage charge following detection of a tachyarrhythmia. In the effort to make implantable devices as small and thin as possible, flat aluminum electrolytic capacitors are used.

Such a flat capacitor is disclosed in U.S. Pat. No. 5,131,388 to Pless et al., which is incorporated herein by reference. Flat capacitors include a plurality of aluminum layers laminarly arranged in a stack. Each layer includes an anode and a cathode, with the anodes and cathodes being commonly connected to respective connectors. The layers may be cut in nearly any shape, to fit within a similarly shaped aluminum housing designed for a particular application. With an aluminum housing, the cathode layers preferably are together connected to the housing, while the anodes are together connected to a feed-through post that tightly passes through a hole on the housing, but is electrically insulated from the housing. The feed-through post serves as an external connector for interfacing with other components.

Existing capacitors suffer a trade off in the selection of feed-through material. High purity aluminum such as 1199 alloy having 99.99% purity, is required for the anode material and for anode connecting material inside high quality aluminum electrolytic capacitors. However, this and other similarly useful alloys are inherently very soft, rendering them unsuitable for the strength required of a durable connector. A larger feed-through would have somewhat increased strength, but would sacrifice the desired miniaturization of the implantable device. Also, high purity aluminum is unsuitable for receiving solder or solder-compatible plating, as required for connection to the external portion of the feed-through. The feed-through must also be electrically conductive to avoid resistive energy loss.

The disclosed embodiment provides an aluminum electrolytic capacitor with an aluminum housing defining a chamber, and having a feed-through aperture providing communication with the chamber from outside of the housing. A number of aluminum anode layers are positioned within the chamber, and a feed-through member formed of a first conductive material occupies the feed-through aperture. The feed-through member has an inner end extending into the chamber, an outer end extending externally from the housing, and an insulative sleeve encompassing an intermediate portion of the feed-through member and directly contacting the housing at the feed-through aperture to prevent electrical contact between the feed-through member and the housing. A connection element formed of a second different conductive material is attached to the inner end of feed-through member and spaced apart from the housing. A compressible insulative gasket may be positioned between the housing and the connection element to provide insulation and a fluid seal.

DETAILED DESCRIPTION OF A PREFERRED EMBODIMENT

Figure 1:
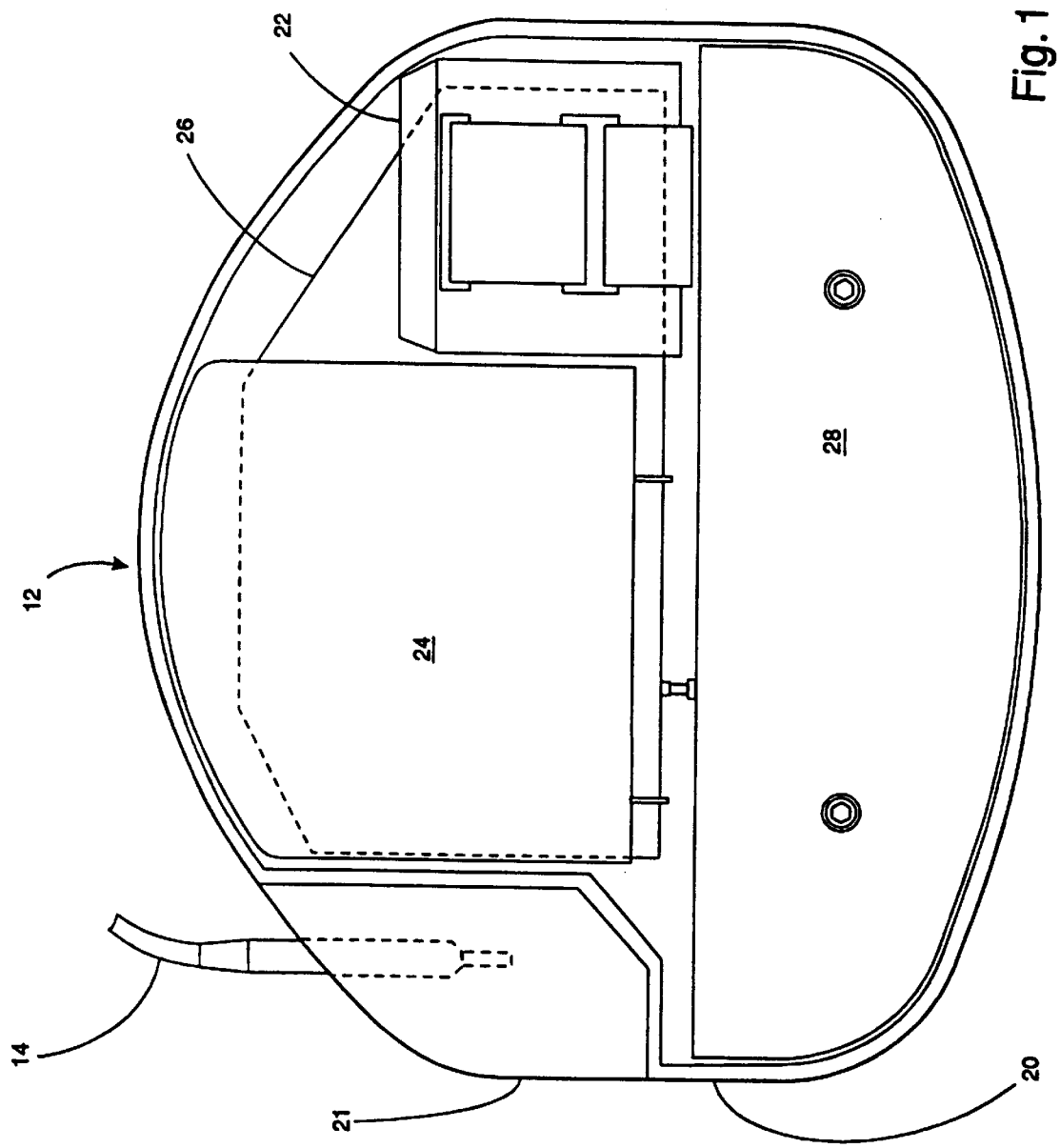
FIG. 1 is a plan view of a cardiac therapy device according to a preferred embodiment of the invention.

FIG. 1 illustrates a defibrillator 12 for pectoral implantation. A single pass endocardial lead set 14 extends from the unit, through the patient's subclavian vein, and into the patient's heart. The defibrillator 12 includes an outer housing 20 that includes a connector portion 21 for attachment of the lead set 14. The housing 20 contains a transformer 22, a battery 24, control circuitry 26, and two capacitors 28 (only one shown.) The battery provides low voltage electrical energy to the transformer and its associated circuitry to charge the capacitors when needed so that they may provide a high voltage shock. The control circuitry 26 connects to the lead set 14 so that it may sense and analyze electrical signals from the heart, and control the delivery of a an appropriate therapy such as a high voltage shock.

Figure 2:
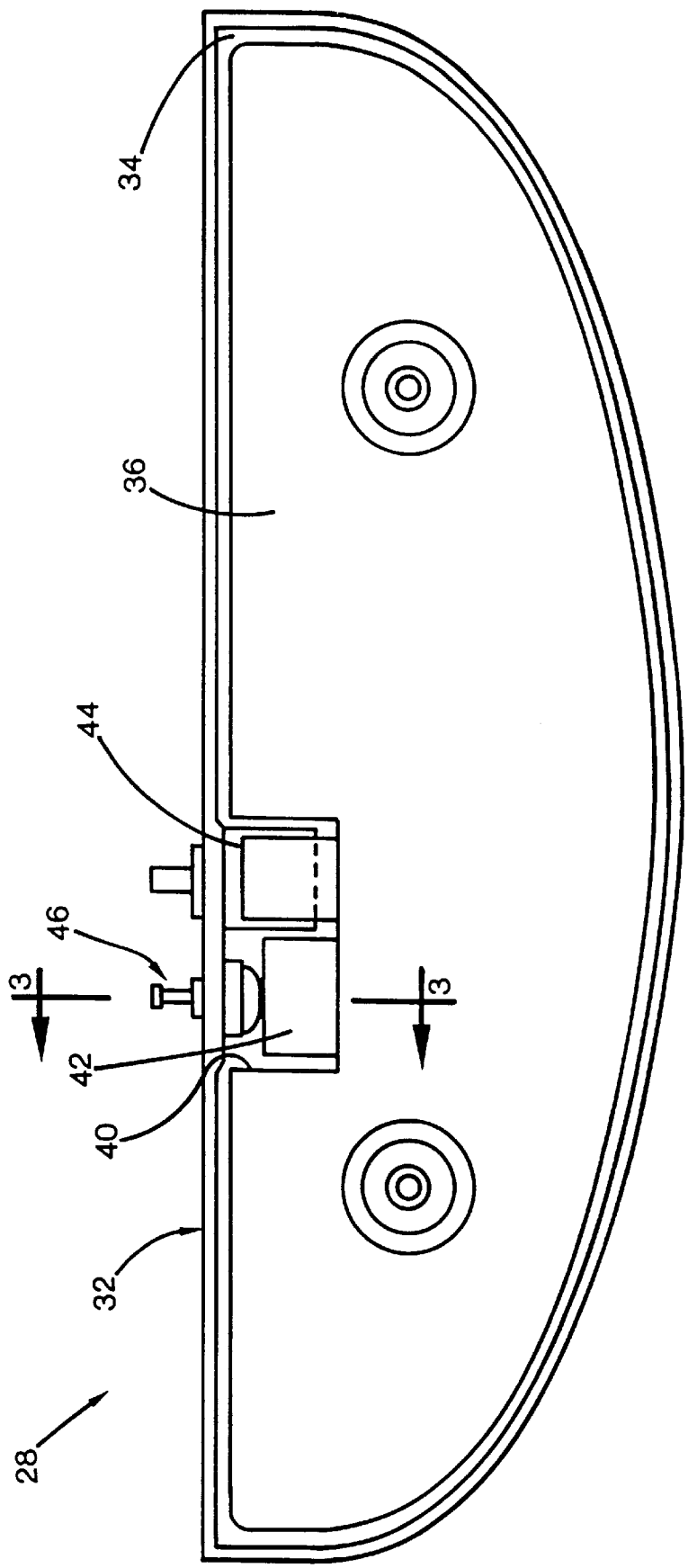
FIG. 2 is a plan view of a capacitor according to the embodiment of FIG. 1.

FIG. 2 illustrates in detail the construction of the capacitor 28, which may be designed as virtually any flat shape to conform to a desired housing shape. The capacitor includes a metallic housing 32 defining a chamber 34, in which resides a capacitor stack 36. The housing includes a lid (not shown) that is welded about the periphery to provide a hermetic seal to retain electrolyte fluid. The capacitor stack 36 is formed of a number of essentially identical flat capacitor layers whose electrical elements are connected in parallel. The layers include alternating interleaved aluminum anode and cathode sheets. The sheets have cutout regions 40 at their peripheries, with the cutouts of each layer being aligned when the sheets are installed in the housing to provide space for electrical connections. The anodes include anode tabs or plate extensions 42 extending into the cutout in registration with each other. These plate extensions are masked during etching so that they remain flexible and may easily be compressed together and joined at their free ends by welding. These free ends are simultaneously joined to a high purity 1199 aluminum ribbon 93 (see FIG. 3). A YAG laser is a suitable welder. The ribbon will have been preattached to the head of an anode feed through assembly as will be discussed below. Similarly, the cathodes include cathode tabs 44 that extend into the cutout region and are registered with each other, but spaced apart from the anode tabs to allow separate connection without shorting. The cathodes, like the anodes, are connected together in parallel when the respective tabs are brought together in a bundle.

Figure 3:
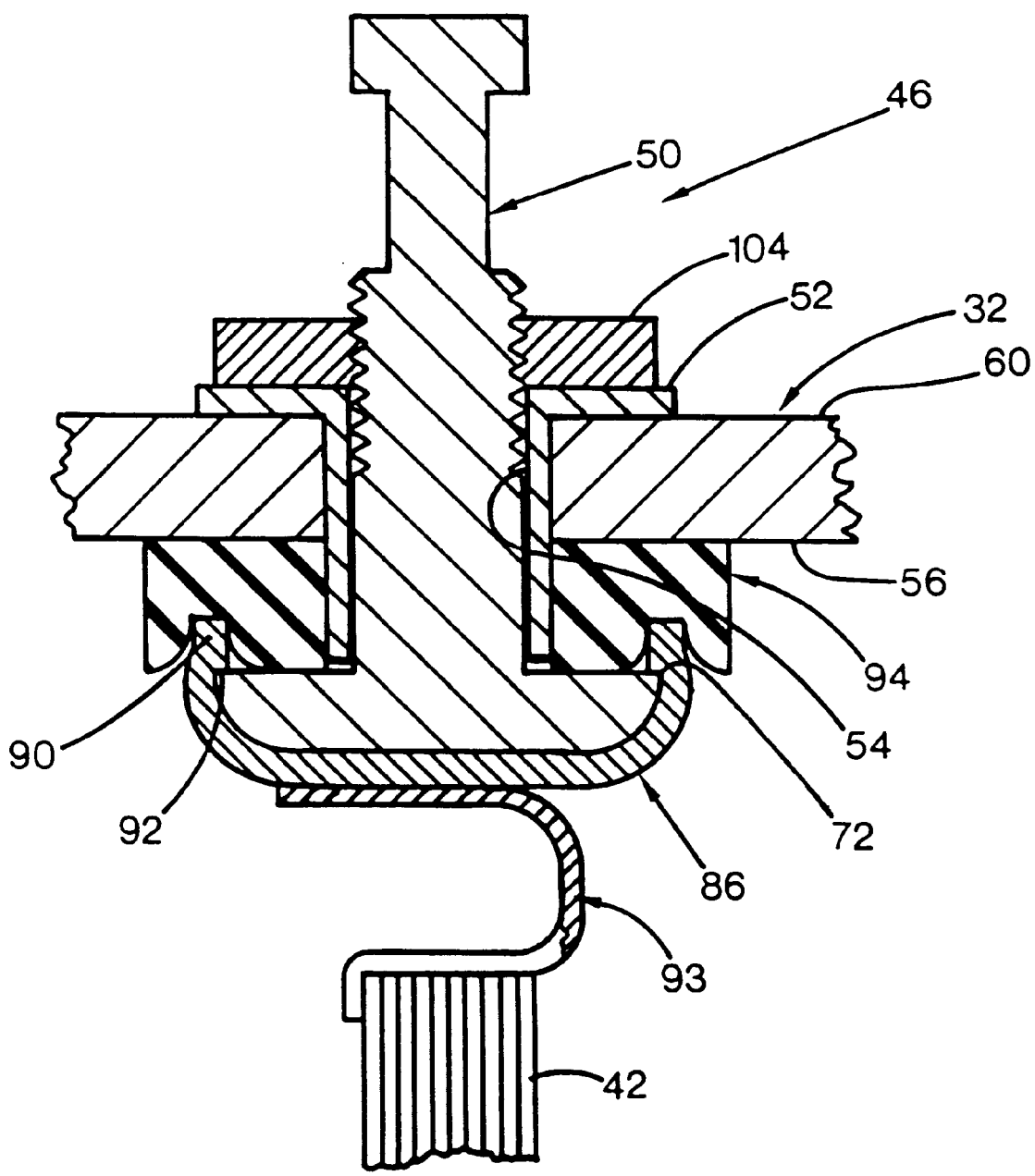
FIG. 3 is an enlarged sectional view of a portion of the capacitor of FIG. 2.

An anode feed-through assembly 46 is connected to the housing to extend from the interior of the housing to protrude externally. As shown in FIG. 3, the feed-through assembly includes a conductive post 50 that is closely received within an insulating sleeve 52 that occupies a feed-through bore 54 defined in the lateral wall of the housing. For reference, the housing wall 32 has an interior surface 56 and an exterior surface 60.

Figure 4:
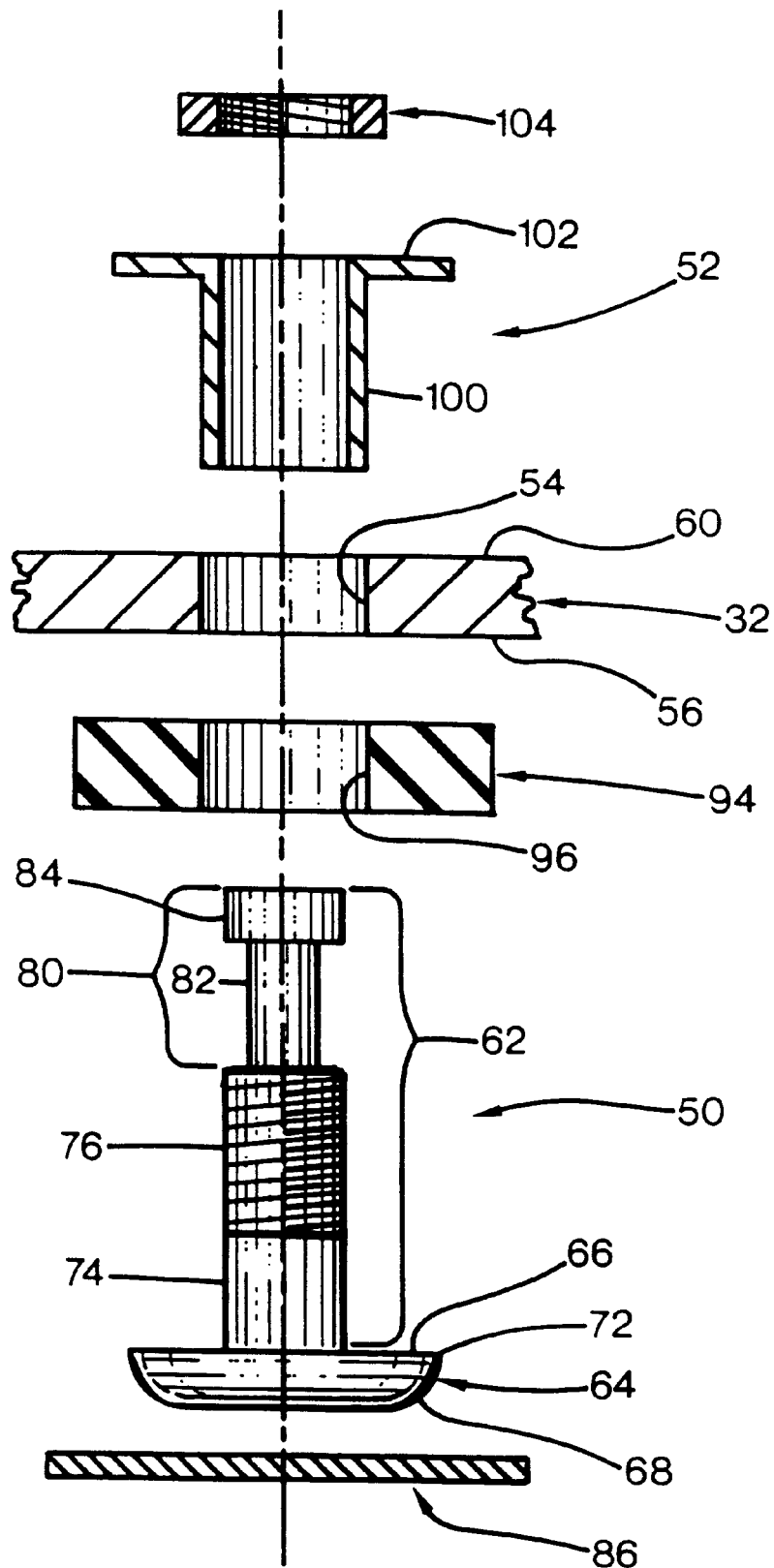
FIG. 4 is an exploded view of a portion of the capacitor of FIG. 2.

As shown in FIG. 4, the post 50 has an elongated shank 62, and an enlarged head 64 having a flat compression surface 66 from which the shank extends, and an opposed rounded head surface 68. The head surfaces 66 and 68 meet at a sharp corner edge 72 that encircles the head. The shank 62 includes a smooth cylindrical portion 74 adjacent the head 64, a threaded portion 76 adjacent the smooth portion 74 and having an equal or lesser diameter. An external terminal 80 extends from the threaded portion, and has an elongated first portion 82 with a diameter less than the threaded portion, and a button 84 with a diameter less than the smooth portion 74 and greater than the first portion 82.

An aluminum disk element 86 is connected to the head of the post 50 to encompass the rounded head surface 68. The disk has a diameter greater than the head, and is ultrasonically welded to the head to create a bond that covers a major portion of the head surface. The disk is crimped to conform to the shape of the head. As shown in FIG. 3 and 4, the periphery of the disk is formed into a cylindrical skirt or flange 90 with an edge that extends in the direction of the shank. The crimping process compresses or swages the disk radially inward slightly toward the shank 62, so that a step 92 is formed in the disk by the head edge 72. Thus, the step engages the compression surface 66 of the head 64 to prevent the disk from being detached from the head by further assembly discussed below. As noted above, a ribbon 93 of 1199 aluminum is ultrasonically bonded to the disk, and extends freely for attachment to the bundle of anode extension tabs 42. The ribbon has a length of about 0.25 inch between the tabs 42 and the disk 86, allowing sufficient slack for sequential assembly of the elements into the housing after the ribbon is attached. After assembly, the ribbon may be compressed to take up any slack, and to prevent it from contacting the conductive housing.

An elastomeric washer 94 is installed on the shank 62. The washer has an outside diameter greater than the finished post head including the crimped disk, and defines a central hole 96 having a diameter comparable to the diameter of the housing wall bore 54. The insulating sleeve 52 has a cylindrical portion 100 with a planar flange 102 extending radially at the external end of the sleeve. The cylindrical portion has an outer diameter that closely fits the wall bore 54 and the washer hole 96, and an inner diameter that closely receives the smooth portion 74 of the post shank 62. Although a snug fit, the shank, sleeve, and housing bore are not so tight as to prevent easy installation and positional adjustment.

To assemble the feed-through assembly, the sleeve 52 is inserted from the exterior of the housing so that the sleeve flange rests against the exterior surface 60 of the housing wall, and so that the sleeve protrudes into the housing interior by a distance slightly less than the thickness of the washer 94. The washer is installed about the protruding portion so that it rests against the interior surface 56 of the housing wall, and the post assembly is inserted through the sleeve so that the disk flange 90 encounters the washer. Thus, at least part of the threaded portion of the shank extends beyond the wall and flange sleeve.

A nut 104 engages the threads, and rests against the flange of the sleeve so that the nut is electrically isolated from the housing. The nut is torqued to draw the post in an exterior direction, thereby compressing the rubber washer. To achieve an adequate seal between the post head disk flange 90 and the washer 94, and between the washer and the housing interior surface 56, the washer is compressed by 30–50%. That is, the resulting distance between the post head flange and the housing wall is about 50–70% of the original thickness of the washer. The nut permits components to be selected without the disadvantageous requirements of tight dimensional tolerances. Preferably, a vise is used to press the post head into the rubber by a preselected amount during assembly. The amount of penetration is controlled by pressing the pin into the rubber a measured amount. After pre-seating the anode pin by the preselected compression amount, the nut is installed and tightened to maintain the compression. In an alternative embodiment, to prevent the flange from cutting too deeply into the washer, the rubber washer effectively "bottoms out" against the compression surface 66 of the post head. To provide this alternative feature, the flange extension distance may be less than the thickness of the washer.

The swaged construction of the post head prevents the forces of compression from stressing the ultrasonic weld between the aluminum disk and the post head; the step 92 bears substantially all the force. Although the fluid contents of the capacitor are sealed by the compressed rubber washer, an additional seal is provided by applying a bead of epoxy encapsulant to the nut, sealing the crevices between the threaded post, nut, sleeve flange, and housing. The encapsulant locks the nut in position, and prevents the accumulation of contaminants in crevices.

In the preferred embodiment, the disk 86 is 1199 aluminum alloy, with a purity of 99.99%. To achieve satisfactory ultrasonic bonding to the anode layers, a purity of at least 95% is required, with current bonding processes benefiting from the highest possible purity. The preferred high purity composition is used to optimize compatibility with the same material used for the capacitor foil sheets. This usage provides low leakage current in the capacitor. Even an 1188 (99.88% purity) alloy is considered inadequate because the insulator that comprises the capacitor insulating element in aluminum electrolytic capacitors is the layer of aluminum oxide formed on the surface of the aluminum. This oxide film is formed using aluminum from the anode and oxygen from the forming solution, with a portion of each being incorporated into the insulating oxide film. Impurities in this oxide film degrade its insulating properties and its useful life as an insulator. Since impurities in the aluminum anode and forming bath will be incorporated into the oxide film, it is essential to maintain high purity in both. Electrolyte is placed inside the capacitor housing to contact the film on the side opposite the aluminum. A second function for this electrolyte is to grow oxide in places where the oxide layer was damaged or missing. This may include sheet edges and the bonding tab. An internal portion of the anode feed through comprising the disk 86 and an aluminum ribbon connecting the aluminum disk 86 to the anode is welded to the anode plates extensions or tabs 42 of the capacitor stack 36. These parts of the anode connection are subject to the same considerations as the anode plate, since it is also insulated by an oxide film grown on its surface. Therefore, it also is preferably formed of the 1199 alloy.

The post 50 is preferably composed of 98% copper and 2% beryllium. Suitable alternatives must have sufficient electrical conductivity for a given post diameter in the miniaturized capacitor, and must have mechanical strength to provide a secure connection. The post material must also be suitable for ultrasonic welding or bonding, and be capable of receiving a soldered connection. In the preferred embodiment, the external portion 80 of the post is plated to facilitate soldering. A inner plating layer of sulfamate nickel 0.0001 inch thick is applied directly to the post, and a second outer layer of dull Tin is applied over the inner layer to a thickness of 0.0003 inch.

After the housing is manufactured and the anode feed-through installed, the capacitor components are installed and connected. The anode plate extension or tabs 42 are compressed together and electrically connected at their free ends, such as with a YAG laser. The welded anode tab bundle is then ultrasonically welded to the disk 86 at the head of the post 50. The cathode tabs 64 are ultrasonically welded to the housing. The lid is then secured to the housing and laser welded about the periphery to provide a hermetic seal. The housing is then filled with electrolyte through a small hole which is later sealed.

Although the above invention is described in terms of a preferred embodiment, the invention is not intended to be so limited.

What is claimed is:

1. An aluminum electrolytic capacitor comprising:

an aluminum housing defining a chamber, and defining a feed-through aperture providing communication with the chamber from outside of the housing;

a plurality of aluminum anode layers positioned within the chamber, a feed-through member formed a first conductive material and received within the feed-through aperture;

the feed-through member having an inner end extending into the chamber, an outer end extending externally from the housing, and an insulative sleeve encompassing an elongated intermediate portion of the feed-through member and directly contacting the housing at the feed-through aperture to prevent electrical contact between the feed-through member and the housing; and a connection element formed of a second different conductive material attached to the inner end of the feed-through member and spaced apart from the housing and including a head having a diameter larger than the diameter of the aperture.

2. The capacitor of claim 1 wherein the feed-through member is formed of a copper alloy to provide electrical conductivity and mechanical strength.

3. The capacitor of claim 2 wherein the copper alloy includes a major portion of copper and a minor portion of beryllium.

4. The capacitor of claim 2 wherein the copper alloy includes between 95% and 99% copper and between 1% and 5% beryllium.

5. The capacitor of claim 2 wherein the copper alloy includes about 98% copper and about 2% beryllium.

6. The capacitor of claim 1 wherein the connection element is formed of aluminum.

7. The capacitor of claim 1 wherein the connection element is formed of aluminum of at least 95% purity.

8. The capacitor of claim 1 wherein the connection element is formed of aluminum of at least 99% purity.

9. The capacitor of claim 1 including an elastomeric insulator positioned between the connection element and at least a portion of the housing.

10. The capacitor of claim 9 wherein the insulator is compressed between the connection element and the housing to provide a fluid seal.

11. The capacitor of claim 1 including a fastener connected to the feed-through member and securing the feed-through member in a selected position relative to the housing.

12. The capacitor of claim 11 wherein the feed-through member is externally threaded, the fastener is threadably engaged to the feed-through member, an aluminum element is formed to provide a cylindrical flange having an edge facing a housing wall, and including a compressible elastomeric washer compressed between the edge and the housing wall, such that a fluid seal is provided to prevent fluid from escaping the housing through the feed-through aperture.

13. An implantable cardiac therapy device comprising:

a device housing defining a chamber;

a plurality of interconnected electronic components positioned within the chamber;

a first component including a component housing defining an interior space, and defining a passage through which a conductive post extends from the interior space to outside the component housing, the conductive post formed of a first material;

a conductive cap formed of a second, different material attached to the post and positioned with the component housing;

an elastomeric washer defining a hole through which the post passes, the washer being positioned within the component housing; and the washer being compressed between the cap and a portion of the component housing to provide a fluid seal encompassing the passage.

14. The device of claim 13 wherein the cap is swaged about a portion of the post to engage the post and to resist dislodgment from the post due to the elastic reaction force of the washer.

15. The device of claim 14 wherein the cap is ultrasonically bonded to the post to provide ohmic contact therebetween.

16. The device of claim 13 wherein the cap is formed of aluminum and the post is formed of a copper alloy.

* * * * *

UNITED STATES PATENT AND TRADEMARK OFFICE
CERTIFICATE OF CORRECTION

PATENT NO. : 5,926,357

DATED : July 20, 1999

INVENTOR(S) : Elias, et al.

It is certified that error appears in the above-identified patent and that said Letters Patent is hereby corrected as shown below:

Title page item [75] Inventors, please add "Scott McCall, Six Mile, S.C.;" as an inventor.

Signed and Sealed this

Seventh Day of December, 1999

*Attest:*

Q. TODD DICKINSON

*Attesting Officer*  *Acting Commissioner of Patents and Trademarks*